(12) United States Patent
Clary

(10) Patent No.: US 7,471,057 B2
(45) Date of Patent: Dec. 30, 2008

(54) SERVO-CONTROL SYSTEM FOR AN UNBALANCED ROTOR VIBRATOR

(75) Inventor: Sylvain Clary, Pau (FR)

(73) Assignee: Eurocopter, Marignane (FR)

( * ) Notice: Subject to any disclaimer, the term of this patent is extended or adjusted under 35 U.S.C. 154(b) by 124 days.

(21) Appl. No.: 11/604,205

(22) Filed: Nov. 27, 2006

(65) Prior Publication Data

US 2007/0120515 A1    May 31, 2007

(30) Foreign Application Priority Data

Nov. 28, 2005    (FR) .................................. 05 12055

(51) Int. Cl.
*G05D 19/02*    (2006.01)
*B06B 1/16*    (2006.01)
(52) U.S. Cl. ........................ 318/683; 318/610; 318/625; 318/119
(58) Field of Classification Search ......... 318/609–611, 318/623, 625, 629, 632, 651–653, 683, 119; 700/275, 280; 702/33, 41, 56
See application file for complete search history.

(56) References Cited

U.S. PATENT DOCUMENTS

| | | | | |
|---|---|---|---|---|
| 3,874,818 | A | * | 4/1975 | Saunders et al. ............. 416/144 |
| 3,887,296 | A | * | 6/1975 | Mills et al. ................... 416/145 |
| 3,910,720 | A | * | 10/1975 | Vincent et al. ............... 416/145 |
| 4,145,936 | A | * | 3/1979 | Vincent et al. ............. 74/574.2 |
| 5,005,439 | A | | 4/1991 | Jensen et al. |
| 5,213,184 | A | | 5/1993 | Legouis et al. |
| 5,473,698 | A | | 12/1995 | Garnjost et al. |
| 6,212,445 | B1 | | 4/2001 | Barba et al. |
| 7,132,817 | B2 | | 11/2006 | Noe |
| 2006/0083617 | A1 | * | 4/2006 | Jolly et al. .................. 416/133 |

FOREIGN PATENT DOCUMENTS

| | | |
|---|---|---|
| EP | 0 409 462 | 1/1991 |
| EP | 0 505 976 | 9/1992 |
| EP | 1 439 010 | 7/2004 |
| FR | 2 606 110 | 5/1988 |
| WO | 2004/087343 | 10/2004 |

* cited by examiner

*Primary Examiner*—Bentsu Ro
(74) *Attorney, Agent, or Firm*—Young & Thompson

(57) ABSTRACT

The invention applies to a vibrator comprising two pairs (A, B) of unbalanced rotors (10 to 13) driven in synchronous rotation by a first motor, and a second motor arranged to drive a phase shifter mechanism so as to adjust a phase difference between the first pair of rotors and the second pair of rotors; the system comprises:

a sensor (C1) for sensing rotation of a rotor of the first pair of rotors;

a sensor (C2) for sensing rotation of a rotor of the second pair of rotors, or for sensing the position of the phase shifter mechanism;

means for controlling the rotation of the first motor as a function of the phase and the frequency of a force setpoint signal and as a function of the signals delivered by the sensors; and means for controlling the rotation of the second motor as a function of the phase, the frequency, and the amplitude of the force setpoint signal and as a function of the signals delivered by the sensors.

13 Claims, 3 Drawing Sheets

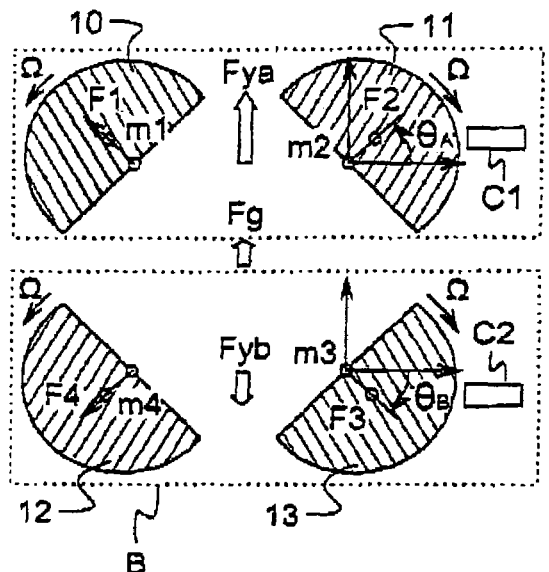
Fig.1
Fig.3
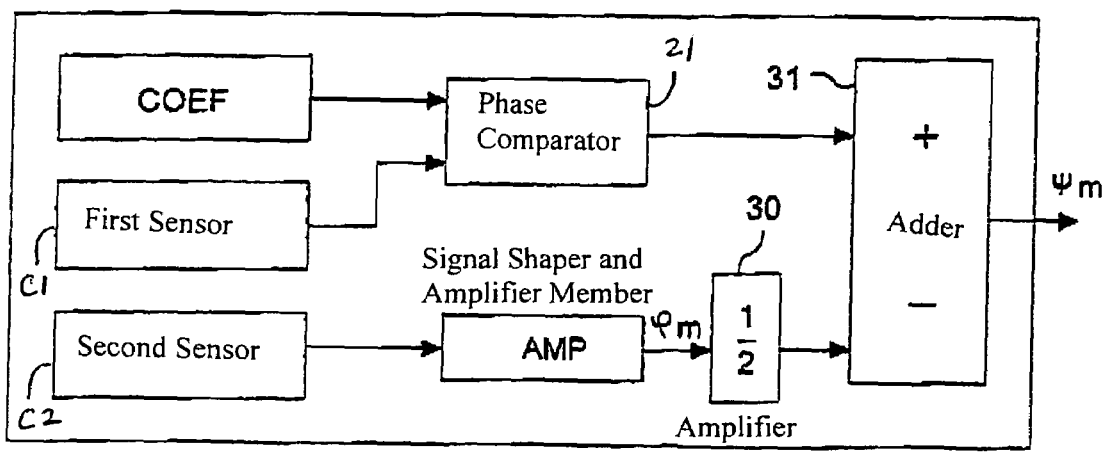

SERVO-CONTROL SYSTEM FOR AN UNBALANCED ROTOR VIBRATOR

The present invention relates to a servo-control device or system for a vibrator or force generator having unbalanced rotors.

The technical field of the invention is that of actively attenuating vibration on board helicopters and other rotary wing aircraft.

BACKGROUND OF THE INVENTION

It is known to fit such aircraft with actuators for eliminating or attenuating the aircraft vibration that results in particular from the alternating forces applied to the aircraft fuselage by the lift and propulsion mechanism of the aircraft (in particular its rotor).

For this purpose, aircraft vibration is measured using at least one accelerometer that delivers a vibration measurement signal, which measurement signal is processed by processor means, possibly including an algorithm recorded in an electronic card or in an on-board computer, so as to obtain a control signal that is applied to the actuator in order to generate forces opposing the measured vibration, as described in U.S. Pat. No. 5,473,698, for example.

The forces can be the result of beating motion of a mass mounted to move in translation relative to a structure of the aircraft and driven by a linear electromagnetic actuator; it is also known to use a rotary actuator comprising unbalanced rotors for producing these forces by the centrifugal effect, as described for example in U.S. Pat. No. 5,005,439.

The present invention applies in particular to vibrators comprising two pairs of unbalanced rotors (or flyweights) in which the rotors in each pair are contrarotating and synchronous, the axes of rotation of all four rotors being parallel, the (flat) rotors or flyweights extending substantially in a common plane orthogonal to the axes of rotation of the rotors.

The permanent synchronization of the two contrarotating rotors in each of the pairs of rotors can be obtained electronically; this applies to vibrators having an electric motor associated with each rotor for driving it in rotation, such as the vibrators described in the following patents: FR 2 606 110; EP 0 505 976; and EP 1 439 010. In document FR 2 606 110, a Kalman filter receives a vibratory signal delivered by an accelerometer and in turn delivers a signal representative of the frequency, the amplitude, and the phase of the vibratory system comprising the vibrating aircraft and the vibrator (or "anti-vibrator"). On the basis of this signal, a computer controls the speed and the phase of each motor, via a comparator. In document EP 0 505 976, it is stated that the Kalman filter produces an estimate of the force to be compensated and of its angular frequency, and also of a force in quadrature. That data is delivered to a calculation unit which deduces therefrom the value of a half phase-offset from which four speed setpoints are calculated that are transformed into four power supply voltages. A calculation module also makes use of the signals coming from the four angle encoders to produce a signal that is an image of the resultant force generated by the flyweights. This signal is summed with the residual acceleration signal and the result of the summing is applied as an input to the Kalman filter.

The system described in EP 1 439 010 comprises, for each unbalanced wheel, a sensor delivering a pulse signal on each revolution of the wheel whenever the flyweight is in a characteristic position, and it includes a signal processor receiving a setpoint signal. A phase reference pulse is produced during an (upward) zero crossing of the setpoint signal. On the basis of these signals, a speed error signal and a phase error signal are calculated for each rotor; furthermore, two phase setpoint signals are calculated from the normed amplitude of the setpoint signal. On the basis of these signals, a speed control signal and a phase control signal with proportional and integral correction are summed in order to provide a control signal for each motor.

Those generators and their motor control systems are complex.

The rotors in each of the pairs of rotors can also be synchronized mechanically by means of gearing as described in particular in patent EP 0 840 191, or by means of a belt as described in particular in international application WO 2004/087343.

In those vibration generators, a first electric motor is used to drive the rotors in rotation, while a second electric motor is used to adjust/drive a phase shifter mechanism and/or a differential mechanism serving to adjust mechanically a phase difference between a first pair of synchronous rotors and a second pair of synchronous rotors.

OBJECTS AND SUMMARY OF THE INVENTION

It is more particularly to this type of vibrator that the invention applies, which invention seeks to provide a simple system for servo-controlling the vibrator to a setpoint signal.

An object of the invention is to propose a stable and robust system for servo-controlling such vibrators on a force setpoint signal of frequency and amplitude that vary over time.

An object of the invention is to propose a simple and high-performance system for servo-controlling a vibrator having four unbalanced rotors driven by a first motor and presenting a phase difference that is adjusted mechanically by a device that is itself driven by a second motor.

In one aspect, the invention provides such a servo-control system comprising:
  a first sensor sensitive to the angular position of a rotor of the first pair of rotors;
  a second sensor sensitive to the angular position of a rotor of the second pair of rotors or to the position of the phase shifter mechanism;
  first control means for controlling the first motor as a function of the phase and the frequency of the force setpoint signal and as a function of the signals delivered by the first and second sensors; and
  second control means for controlling the second motor as a function of the phase, of the frequency, and of the amplitude of the force setpoint signal and also as a function of the signals delivered by the first and second sensors.

In preferred embodiments of the invention:
  the second control means comprise means for calculating a phase difference setpoint $\phi co$ between the two pairs of rotors as a function of the frequency Fco and the amplitude Uco of the force setpoint signal, and first comparator means for comparing the calculated phase difference setpoint $\phi co$ and the measured phase difference $\phi m$ between the two pairs of rotors, and for delivering a control signal for the second motor;
  the phase difference setpoint $\phi co$ between the two pairs of rotors is determined in application of the following formula:

$$\phi co = ar\cos(Uco/U\max * A\max/(16 * m * r * \pi^2 * Fco^2))$$

where m and r are respectively the mass and the eccentricity of the rotor unbalance, Amax is the maximum force that the vibrator can exert, and Umax is the amplitude of the force setpoint signal corresponding to said maximum force;

the second control means comprises means limiting the phase difference between the two pairs of rotors—in particular means for maintaining a phase difference substantially equal to 180° between the two pairs of rotors—so long as the difference between the frequency of rotor rotation and the frequency of the setpoint signal is greater than a predetermined value; this makes it possible to maintain a zero force while the flyweights are starting up by causing the forces generated by the two pairs of flyweights to cancel;

the second control means comprise a first regulator receiving a signal delivered by the first comparator means and outputting a control signal for the second motor;

the first control means comprises means for measuring a phase difference in order to determine a measured phase difference $\psi m$ between the force generated by the vibrator and the force setpoint signal, and for controlling the first motor as a function of said phase difference;

the system includes first frequency measurement means for measuring the frequency Fco of the force setpoint signal, second frequency measurement means for measuring the frequency Fm of rotation of one of the pairs of rotors as a function of the signals delivered by the first sensor, and second comparator means for comparing said frequencies Fco and Fm and for outputting a comparison signal for controlling the first motor;

the first control means comprise a second regulator receiving a signal delivered by the second comparator means, a third regulator receiving a signal delivered by the phase difference measurement means, and a summing circuit receiving the signals delivered by the second and third regulators and outputting a control signal for the first motor;

the system includes means for maintaining a signal that is substantially zero at the output from the third regulator so long as the difference between the frequency of rotation of the rotors and the frequency of the setpoint signal is greater than a predetermined value; and the system presenting a response dynamic range of at least 100 hertz (Hz), e.g. equal to about 200 Hz; with the dynamic range varying in proportion with the frequency of the force to be generated.

BRIEF DESCRIPTION OF THE DRAWINGS

Other aspects, characteristics, and advantages of the invention appear from the following description given with reference to the accompanying drawings which show preferred embodiments of the invention without any limiting character.

FIG. 1 shows the operating principle of a vibrator to which the invention applies.

FIG. 3 is a block diagram showing part of a variant embodiment of the invention in which only one detector is used to detect rotor rotation, the system further including a sensor for sensing the position of a phase shifter mechanism.

MORE DETAILED DESCRIPTION

With reference to FIG. 1, the servo-control system comprises a first sensor C1 sensitive to the angular position $\theta A$ of the rotor 11 of the first pair A comprising synchronous contrarotating rotors 10 and 11 whose unbalances result in a vibratory force directed along arrow Fya; the system includes a second sensor C2 sensitive to the angular position $\theta B$ of the rotor 13 of the second pair B comprising synchronous and contrarotating rotors 12 and 13 whose unbalances result in a vibratory force directed along arrow Fyb.

In the variant corresponding to FIG. 3, the sensor C2 is sensitive to the position of a mechanism for adjusting the phase difference between the first pair of rotors and the second pair of rotors.

Figure 2:
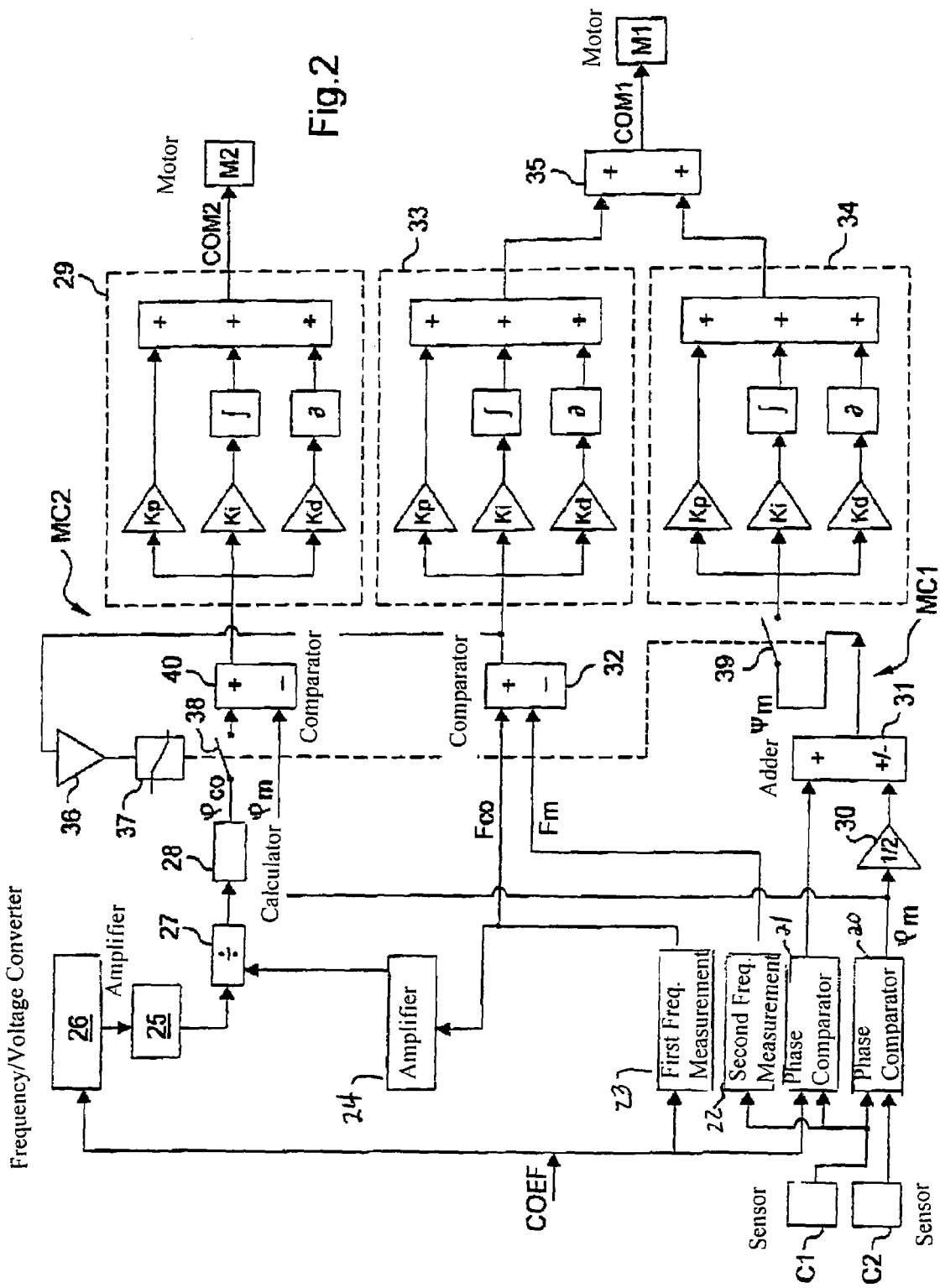
FIG. 2 is a block diagram of a preferred first embodiment of a system of the invention.

With reference to FIG. 2, the servo-control system comprises first control means MC1 for controlling the first motor M1 as a function of the phase and the frequency of the force setpoint signal COEF and as a function of signals delivered by the sensors C1 and C2, and also a second control means MC2 for controlling the second motor as a function of the phase, the frequency, and the amplitude of the force setpoint signal and also of the signals delivered by the sensors C1 and C2.

The second control means MC2 includes means for calculating a phase difference setpoint $\phi co$ between the two pairs of rotors as a function of the frequency Fco and of the amplitude Uco of the force setpoint signal COEF, said means comprising:

a frequency/voltage converter 26 receiving at its input the signal COEF and delivering at its output the amplitude Uco of said signal;

two amplifiers 24 and 25 of gains respectively equal to Amax/Umax and $16*m*r*\pi^2*Fco^2$, respectively receiving as inputs the signals or data delivered by the modules 23 and 26, and having their outputs connected to the two inputs of a divider 27; and a module 28 for calculating the arcos trigonometric function, its input receiving the output from the divider 27, and its output delivering the phase difference setpoint $\phi co$ between the two pairs of rotors.

This phase difference is thus determined by applying the following formula:

$$\phi co = ar\cos(Uco/Umax*Amax/(16*m*r*\pi^2*Fco^2))$$

where m and r are respectively the mass and the eccentricity of the unbalance of the rotors, Amax is the maximum force that the vibrator can exert, and Umax is the amplitude of the force setpoint signal corresponding to said maximum force.

The second control means MC2 also has a first comparator 40 for comparing the calculated setpoint $\phi co$ for the phase difference with the measured phase difference $\phi m$ between the two pairs of rotors, and for delivering a control signal to the second motor M2 to the input of a regulator 29 delivering a regulated control signal COM2.

The second control means MC2 further comprise means for limiting the phase difference between the two pairs of rotors—in particular means for maintaining a phase difference substantially equal to 180° between the two pairs of rotors—so long as the difference between the frequency of the rotation of the rotors and the frequency of the setpoint signal is greater than a predetermined value.

These limiter means comprise an amplifier 36 receiving as input a signal corresponding to the difference between the frequency Fco of the setpoint signal and the measured frequency Fm of rotor rotation; the output from the amplifier controlling an actuator 37 for opening and closing switches 38 and 39 that perform a function specified in greater detail below.

The first control means MC1 include means for measuring a phase difference in order to determine a measured phase difference ψm between the force generated by the vibrator and the force setpoint signal and for controlling the first motor as a function of said phase difference. These means comprise an amplifier 30 of gain equal to half and an adder 31; the adder 31 receives at its input the phase difference measured between the signal COEF and the sensor C1 by a phase comparator 21.

Another phase comparator 20 receives as inputs the signals from the sensors C1 and C2, and produces as an output the corresponding measured phase difference φm which is applied to the input of the amplifier 30; the output from this amplifier is applied to the second input of the adder 31.

In the variant shown in FIG. 3, there can be seen the amplifier 30 and the adder 31 for calculating the measured phase difference ψm, and also the phase comparator 21; in this variant, the phase difference φm is obtained directly at the output from a signal shaper and amplifier member AMP acting on the signal delivered by the sensor C2 that is sensitive to the phase difference between the two pairs of rotors.

The system includes first frequency measurement means 23 for measuring the frequency Fco of the force setpoint signal, second frequency measurement means 22 for measuring the frequency Fm of the rotation of one of the pairs of rotors as a function of the signals delivered by the first sensor, and second comparator means 32 for comparing said frequencies Fco and Fm and for delivering a comparison signal for controlling the first motor.

The first control means MC1 includes a second PID regulator 33 receiving a signal delivered by the second comparator means 32, a third PID regulator 34 receiving a signal delivered by the means 30, 31 for measuring phase difference, and a summing circuit 35 receiving the signals delivered by the second and third regulators and delivering an output signal COM1 for controlling the first motor M1.

The proposed servo-control is adapted to the flyweight rotors of the vibrator being driven mechanically by means of a belt or an epicyclic gear train, for example. In this type of vibrator, the rotors can be driven by a brushless direct current (DC) motor; the main function of the servo-control applied to the motor is to cause the "flyweights" to rotate at the frequency of a force setpoint signal and with a phase difference relative to said signal that is zero.

The phase difference between the two pairs of rotors can be achieved by means of a DC motor or a stepper motor, the purpose of servo-controlling this motor being to control the modulus of the force generated by the flyweight vibrator.

The system of the invention performs two main functions: extracting data (amplitude, phase, and frequency) from the force setpoint signal, and generating control signals for the two motors as a function of the data, the phase of the force setpoint signal being taken as the phase reference.

The invention makes it possible to make indirect use of the amplitude of the force setpoint signal to control the rotor drive motor; in the event of this amplitude varying, the phase of the force that is generated will also vary; the invention makes it possible to anticipate phase variations and to obtain a fast response for the force that is generated.

The technology used for making the system may be essentially analog, thus enabling the cost of the servo-control to be reduced; it is also possible to use digital circuits.

The analytic model of the vibrator is as follows:

$$F = 4mr\Omega^2 \cos(\phi(t)) \cos(2\pi F0 \cdot t + \Psi(t))$$

where t represents time, F represents the force generated (F=Fya+Fyb), φ (φ=θA−θB) represents the phase difference between the two pairs of flyweights, Ψ (Ψ=(θA+θB)/2) represents the phase difference between the generated force and the control signal, F0 represents the frequency of the generated force, and $\Omega = 2\pi F0$ represents the angular frequency of the force in radians per second.

The amplitude of the force generated thus depends on the frequency of the force and on the phase difference between the two pairs of flyweights.

With the type of actuator for which this servo-control is intended, there is unvarying mechanical coupling between the two flyweights in either pair, which requires the two flyweights to perform contrarotating movement. Other systems require electronic servo-control in order to achieve this function.

The system (cf. FIG. 2) includes a module for extracting data that enables the data that is useful for servo-controlling the two motors to be extracted from the setpoint signal.

The input signal COEF can be filtered (by a bandpass filter) in order to select the operating frequency band of the actuator and in order to limit interference problems.

The force setpoint signal COEF is analyzed in order to extract therefrom its frequency, amplitude, and phase; the frequency Fco of the signal COEF is determined by an (analog) frequency/voltage converter or else by counters that are reset to zero on each rising front of the signal (a digital solution); amplitude is determined by a root mean square (rms) type component (analog), or by calculating a "moving" integral over a duration of one period; this calculation serves to obtain information that is reliable and that is continuously updated, and it requires less computation time than would a discrete Fourier transform; the phase of the signal COEF is used as a reference for synchronizing servo-control: the rising fronts of the setpoint signal are used for synchronizing the generated force with the setpoint.

The three setpoints used for servo-controlling the two motors are as follows:

a setpoint for the frequency of rotor (or flyweights) rotation, which is equal to the frequency Fco of the setpoint signal;

a phase difference setpoint Ψco between the generated force and the setpoint, which is obtained directly by the zero crossings of the signal COEF;

a phase difference setpoint φco between the two pairs of flyweights, which is obtained from the frequency and from the amplitude of the setpoint signal in application of the following expression:

$$\phi co = ar\cos(Uo/U\max \cdot A\max / (4mr(2\pi F0)^2))$$

where Uo represents the amplitude of the signal COEF, Umax represents the maximum amplitude of said signal, Amax represents the maximum amplitude of the force (e.g. 300 decanewtons (daN)) that can be generated by the actuator, and $4mr(2\pi F0)^2$ represents the amplitude of the force to be generated; this calculation serves to ensure that the force that is generated does not exceed the limits imposed by the strength of the generator.

Modules for measuring parameters internal to the actuator serves to estimate the state of the mechanical system (the vibrator) on the basis of the positions of the flyweights. Two rotation sensors (for sensing rotation of the rotors) each deliver one pulse per revolution and serve to reconstitute the force generated by calculating both the phase difference between the two pairs of flyweights and the phase difference between one pair of flyweights and the setpoint signal.

Measuring these two phase differences by means of sensors (e.g. inductive sensors) of minimum resolution (only one pulse per revolution) serves to "average out" values over one revolution, and thus eliminate oscillations due to gravity.

The signals coming from the sensors C1 and C2—and also the setpoint signal COEF—are preferably processed so as to avoid any bounce induced by interference. The processing consists in lowpass filtering followed by applying a switching threshold in order to obtain a clean signal of the "squarewave" type. The type of filtering is selected as a function of the frequency band in which the vibrator operates so as to limit phase delays on the signals.

In order to measure the phase difference φm between the signals from the sensors C1 and C2, one of the two signals is used as a reference; the module 20 calculates the period T of said signal between two successive pulses; to do this, a counter is launched on the rising front of the reference signal and is stopped on the first subsequent rising front of the same signal, and then the counter is reset to zero by a bistable system.

The delay Δt between said reference signal and the second signal is measured in the same manner; if Δt>T/2, Δt can be replaced by −(T−Δt) in order to recenter the phase difference in the range +180° to −180°; the phase difference φ is then equal to ΔT/T*360 (in degrees).

To measure the phase difference φm between the two pairs of flyweights, use is made of the pulses delivered by the sensors C1 and C2 respectively associated with each of the pairs of rotors, the pulses being used as input data to the phase difference calculation unit.

To measure the phase difference Ψm between the generated force and the setpoint, the phase difference is measured between the signal COEF and the signal delivered by the sensor C1 associated with one of the pairs of rotors, and then φ/2 is added thereto (or subtracted therefrom) depending on which pair of rotors is selected.

Each of the motors is regulated by a module including at least one comparator for calculating the error between a setpoint value extracted from the setpoint signal (as described above) and values as measured by the sensors C1 and C2, and at least one regulator serving to generate the control signals COM1 and COM2 for applying to the motors M1 and M2.

The phase difference motor M2 is regulated in simple manner by a PID regulator 29.

In order to regulate the motor M1 for driving the rotors, the speed of the rotors is caused to vary up to a frequency close to that of the setpoint signal so as to make it possible to servo-control the phase difference between the force generated and the setpoint; when the frequency of rotation of the rotors is very far from the frequency of the signal COEF, as happens when starting the vibrator for example, there is no point in controlling the phase difference (the concept of phase difference being meaningless under such circumstances).

Thus, on starting, the servo-control acts on the frequency of rotation without paying attention to phase difference, with the amplitude of the force generated possibly being maintained at zero during this period: φco is maintained at 180° by opening the switch 38, and Ψm is maintained at zero by opening the switch 39; once the setpoint frequency and the rotor frequency becomes close (end of starting), regulation then takes charge of phase, by closing the switches 38 and 39.

The signals COM1 and COM2 are delivered to two power amplifiers (not shown) serving to provide power to the motors as required for producing the vibratory force corresponding to the force setpoint signal COEF.

Figure 4:
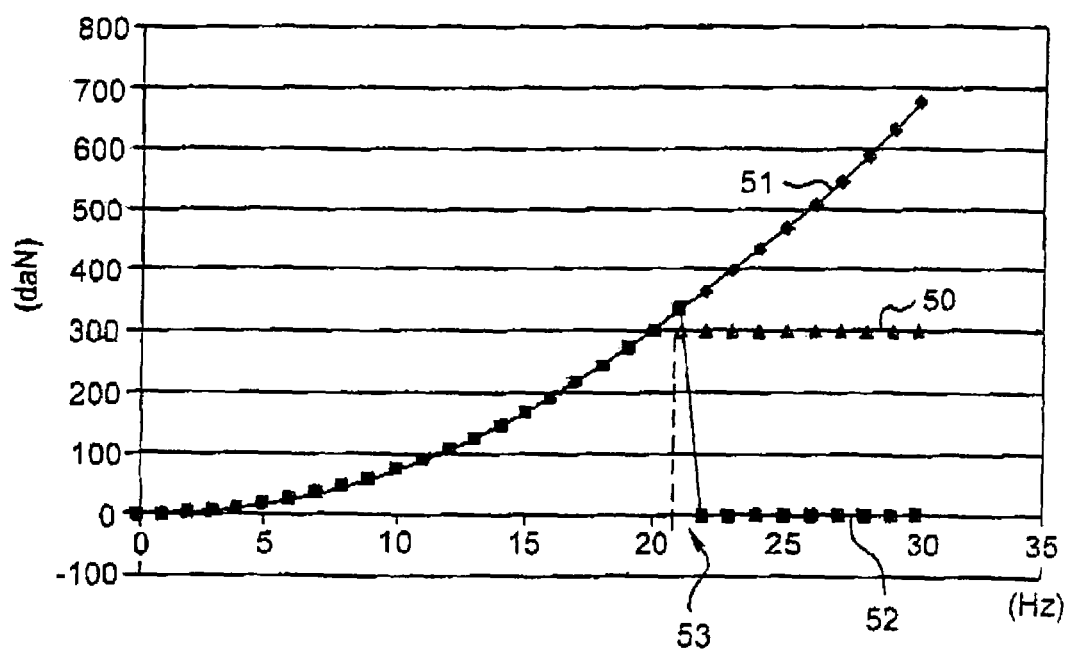
FIG. 4 is a graph showing how the force generated by the vibrator under the control of a system of the invention (plotted up the ordinate) varies as a function of the speed of rotation of the rotors (plotted along the abscissa) in three different embodiments.

In another variant embodiment, a limiter circuit (not shown) can be provided to limit the amplitude of the signal at the input to the regulator 29 so as to limit the force developed by the vibrator to some maximum value, as shown by curve 50 in FIG. 4; for this purpose, the limiter circuit can receive at its input the measured frequency Fm of rotation of the rotors; such a limiter circuit serves, at high speed, to avoid a corresponding increase in force as represented by curve 51.

In another variant, a similar limiter circuit could cause the force generated to be reduced to zero when the maximum authorized speed 53 is exceed, as represented by curve 52.

What is claimed is:

1. A system for servo-controlling a vibrator on a force setpoint signal (COEF) presenting an amplitude and a frequency that vary over time, the vibrator comprising a first pair (A) of unbalanced rotors (10, 11) and a second pair (B) of unbalanced rotors (12, 13), the four unbalanced rotors being driven in rotation by a first electric motor (M1), the system comprising a second electric motor (M2) arranged to drive a phase shifter mechanism, thereby mechanically adjusting a phase difference between the first pair of rotors and the second pair of rotors of the vibrator, the system further comprising:

a first sensor (C1) sensitive to the angular position of a rotor of the first pair of unbalanced rotors;

a second sensor (C2) sensitive to the angular position of a rotor of the second pair of unbalanced rotors, or else to the position of the phase shifter mechanism;

a first control means (MC1) sensitive to the force setpoint signal and to the signals delivered by the first sensor and the second sensor, the first control means being arranged to control the first motor as a function of the phase and the frequency of the force setpoint signal, and also as a function of the signals delivered by the first and second sensors; and a second control means (MC2) sensitive to the force setpoint signal and to the signals delivered by the first sensor and by the second sensor, the second control means being arranged to control the second motor as a function of the phase, the frequency, and the amplitude of the force setpoint signal and also of the signals delivered by the first and second sensors.

2. A system according to claim 1, in which the second control means (MC2) comprise means (24 to 28) for calculating a phase difference setpoint φco between the two pairs of rotors as a function of the frequency Fco and the amplitude Uco of the force setpoint signal, and first comparator means (40) for comparing the calculated phase difference setpoint φco and the measured phase difference φm between the two pairs of rotors, and for delivering a control signal for the second motor.

3. A system according to claim 2, in which the phase difference setpoint φco between the two pairs of rotors is determined in application of the following formula:

$$\phi co = ar\cos(Uco/Umax*Amax/(16*m*r*\pi^2*Fco^2))$$

where m and r are respectively the mass and the eccentricity of the rotor unbalance, Amax is the maximum force that the vibrator can exert, and Umax is the amplitude of the force setpoint signal corresponding to said maximum force.

4. A system according to claim 2, in which the second control means (MC2) includes a first regulator (29) receiving a signal delivered by the first comparator means and outputting a control signal (COM2) for the second motor.

5. A system according to claim 4, in which the first regulator (29) is a PID regulator.

6. A system according to claim 1, in which the second control means (MC2) comprises means (36 to 38) for limiting the phase difference between the two pairs of rotors so long as the difference between the frequency of rotor rotation and the frequency of the setpoint signal is greater than a predetermined value.

7. A system according to claim 1, in which the first control means (MC1) comprises means (30, 31) for measuring a phase difference in order to determine a measured phase difference ψm between the force generated by the vibrator and the force setpoint signal, and for controlling the first motor as a function of said phase difference.

8. A system according to claim 7, including first frequency measurement means (23) for measuring the frequency Fco of the force setpoint signal, second frequency measurement means (22) for measuring the frequency Fm of rotation of one of the pairs of rotors as a function of the signals delivered by the first sensor, and second comparator means (32) for comparing said frequencies Fco and Fm and for outputting a comparison signal for controlling the first motor, and in which the first control means (MC1) comprise a second regulator (33) receiving a signal delivered by the second comparator means (32), a third regulator (34) receiving a signal delivered by the phase difference measurement means (30, 31), and a summing circuit (35) receiving the signals delivered by the second and third regulators and outputting a control signal (COM1) for the first motor.

9. A system according to claim 8, including means (36, 37, 39) for maintaining a signal that is substantially zero at the output from the third regulator so long as the difference between the frequency of rotation of the rotors and the frequency of the setpoint signal is greater than a predetermined value.

10. A system according to claim 8, in which the second and third regulators (33, 34) are PID regulators.

11. A system according to claim 1, including first frequency measurement means (23) for measuring the frequency Fco of the force setpoint signal, second frequency measurement means (22) for measuring the frequency Fm of rotation of one of the pairs of rotors as a function of the signals delivered by the first sensor, and second comparator means (32) for comparing said frequencies Fco and Fm and for outputting a comparison signal for controlling the first motor.

12. A system according to claim 1, in which the first sensor (C1) delivers a single pulse per revolution of the rotor.

13. A system according to claim 1, presenting a response dynamic range of at least 100 hertz (Hz).

* * * * *